United States Patent
Tsubotani

(10) Patent No.: US 11,237,511 B2
(45) Date of Patent: Feb. 1, 2022

(54) FIXING APPARATUS, IMAGE FORMING APPARATUS, METHOD OF CONTROLLING FIXING APPARATUS, AND NON-TRANSITORY RECORDING MEDIUM STORING COMPUTER READABLE PROGRAM

(71) Applicant: Konica Minolta, Inc., Tokyo (JP)

(72) Inventor: Yoshikazu Tsubotani, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/752,492

(22) Filed: Jan. 24, 2020

(65) Prior Publication Data
US 2020/0249610 A1 Aug. 6, 2020

(30) Foreign Application Priority Data
Feb. 5, 2019 (JP) .............................. JP2019-018976

(51) Int. Cl.
*G03G 15/00* (2006.01)
*G03G 15/20* (2006.01)
*G06K 15/14* (2006.01)

(52) U.S. Cl.
CPC .............. *G03G 15/55* (2013.01); *G03G 15/20* (2013.01); *G06K 15/14* (2013.01)

(58) Field of Classification Search
CPC .......... G03G 15/20; G03G 15/55; G06K 15/14
See application file for complete search history.

(56) References Cited

U.S. PATENT DOCUMENTS

| 2008/0199232 A1* | 8/2008 | Takemura | .......... G03G 15/2053 |
| | | | 399/329 |
| 2018/0059593 A1* | 3/2018 | Ishiguro | ................. G03G 15/55 |

FOREIGN PATENT DOCUMENTS

JP 2010-256492 A 11/2010

* cited by examiner

*Primary Examiner* — Clayton E. LaBalle
*Assistant Examiner* — Michael A Harrison
(74) *Attorney, Agent, or Firm* — Squire Patton Boggs (US) LLP

(57) ABSTRACT

A fixing apparatus includes: a first rotating body that contacts a sheet for printing and heats the sheet; a second rotating body that rotates while pressing the first rotating body; a motor that rotates the first rotating body; and a hardware processor that determines whether an abnormal noise occurs on the basis of a plurality of condition values including a torque value of the motor, wherein the hardware processor performs abnormal noise prevention control that increases the rotation of the first rotating body or weakens pressing applied by the second rotating body to the first rotating body in a case where it is determined that the abnormal noise occurs.

11 Claims, 10 Drawing Sheets

*FIG. 8*

| CUMULATIVE USAGE AMOUNT N | THRESHOLD VALUE Ith OF DRIVE CURRENT VALUE I |
|---|---|
| LESS THAN 10000 | Ith1 |
| 10000 TO 20000 | Ith2 |
| 20000 TO 30000 | Ith3 |
| ⋮ | ⋮ |

82

FIXING APPARATUS, IMAGE FORMING APPARATUS, METHOD OF CONTROLLING FIXING APPARATUS, AND NON-TRANSITORY RECORDING MEDIUM STORING COMPUTER READABLE PROGRAM

The entire disclosure of Japanese patent Application No. 2019-018976, filed on Feb. 5, 2019, is incorporated herein by reference in its entirety.

BACKGROUND

Technological Field

The present invention relates to a fixing apparatus that heats a sheet on which an image is formed and an image forming apparatus including the same.

Description of the Related Art

An image forming apparatus that prints an image on a sheet by a xerography method includes a fixing device that applies heat and pressure to the sheet on which a toner image is transferred. Toner that is a color material is melted and fixed on the sheet by heating and pressing.

As a type of a fixing device, there is a pad type in which a fixing nip that sandwiches a sheet is formed by a pad (fixed pressing member) and a roller. According to this pad type, a heat capacity of the fixing device can be made small compared with a roller type in which a fixing nip is formed by a pair of rollers and energy saving can be achieved.

In the pad type, a fixing belt is provided so as to go around a pad as a rotating body for heating the sheet. The fixing belt is interposed between the pad and the roller, and the sheet passes between the fixing belt and the roller. The sheet is conveyed by the rotational drive of the roller, and the fixing belt rotates as the sheet moves. At this time, in the fixing nip, the sheet is heated by the fixing belt while being pushed and pressed against the fixing belt by the roller.

When the sheet does not pass through the fixing nip, the fixing belt and the roller abut on each other, and heat is transferred from the fixing belt to the roller without passing through the sheet. For this reason, a temperature of the roller may be higher than a temperature when the sheet passes through the fixing nip.

JP 2010-256492 A discloses that in an image forming apparatus configured so that a fixing temperature is proportional to a process velocity, the process velocity is decreased when a temperature of the fixing device becomes higher than a reference value, thereby preventing overheating of the fixing device.

When a final sheet of a print job has finished passing through the fixing nip, if the rotation of the rotating body in the fixing device is stopped immediately, heat absorption by the sheet is lost and a heat dissipation amount is less than a heat dissipation amount at the time of rotation. For this reason, a temperature of the rotating body increases rapidly. That is, so-called overshoot occurs. The overshoot causes thermal damage to the fixing device.

As a method of preventing the overshoot, there is a commonly used method in which the roller is rotated at a velocity slower than a velocity at the time of printing until the time when the rotating body cools to some degree after the sheet passes through the fixing nip, and then the rotation is stopped. A travel distance of the fixing device (a value that represents a cumulative usage amount) increases by an amount of the rotation after printing, but by making the rotation velocity slower than a rotation velocity at the time of printing, an increase in the travel distance becomes small, compared with a case where the roller is rotated at the same velocity as the velocity at the time of printing. In other words, in order to delay the end of the life of the fixing device, it is preferable to reduce the velocity of the rotation for preventing the overshoot.

However, there was a case where an abnormal noise thought to be caused by stick-slip at the fixing nip occurred at the time of the rotation after the printing. There was also a case where the abnormal noise did not occur even if the roller was rotated at the same velocity as a velocity in the case where the abnormal noise occurred.

SUMMARY

In view of above problems, the present invention has been made, and an objective of the present invention is to provide a fixing apparatus and an image forming apparatus using the fixing apparatus capable of suppressing an occurrence of an abnormal noise due to stick-slip at a fixing nip.

To achieve the abovementioned object, according to an aspect of the present invention, a fixing apparatus reflecting one aspect of the present invention comprises: a first rotating body that contacts a sheet for printing and heats the sheet; a second rotating body that rotates while pressing the first rotating body; a motor that rotates the first rotating body; and a hardware processor that determines whether an abnormal noise occurs on the basis of a plurality of condition values including a torque value of the motor, wherein the hardware processor performs abnormal noise prevention control that increases the rotation of the first rotating body or weakens pressing applied by the second rotating body to the first rotating body in a case where it is determined that the abnormal noise occurs.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram showing an example of a table used for determining whether the abnormal noise occurs;

DETAILED DESCRIPTION OF EMBODIMENTS

Hereinafter, one or more embodiments of the present invention will be described with reference to the drawings. However, the scope of the invention is not limited to the disclosed embodiments.

Figure 1:
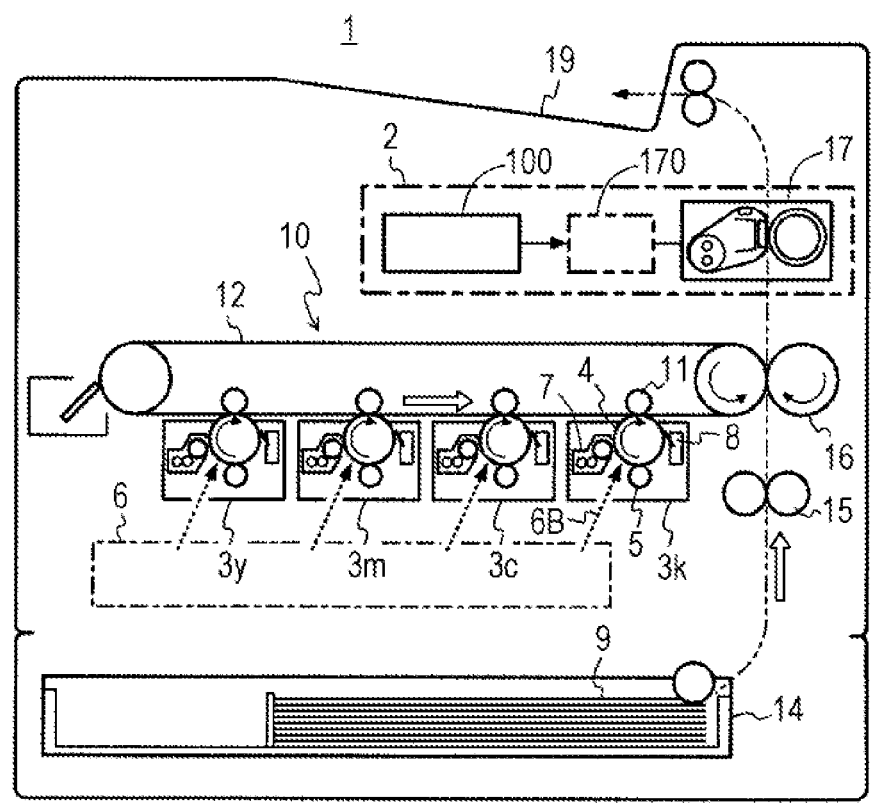
FIG. 1 is a diagram showing an outline of a configuration of an image forming apparatus including a fixing apparatus according to an embodiment of the present invention.
Figure 2:
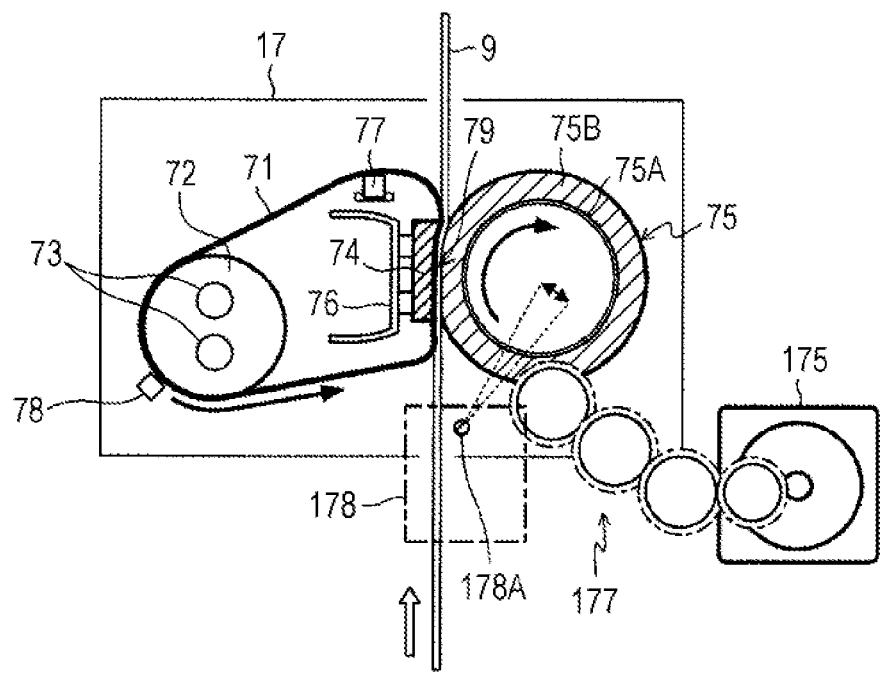
FIG. 2 is a diagram showing a configuration of a fixing device.
Figure 3:
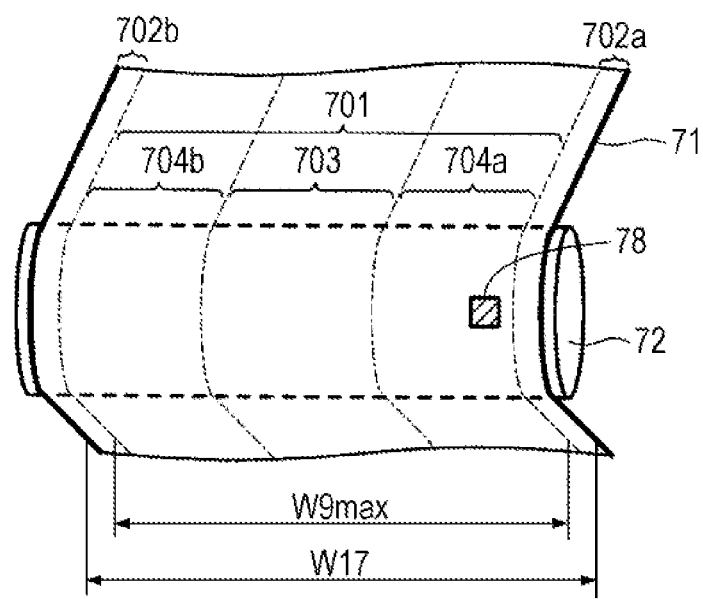
FIG. 3 is a diagram showing a position at which a belt temperature in a width direction of a fixing belt is detected.

FIG. 1 is a diagram showing an outline of a configuration of an image forming apparatus 1 including a fixing apparatus 2 according to an embodiment of the present invention. FIG. 2 is a diagram showing a configuration of a fixing device 17. FIG. 3 is a diagram showing a position at which a belt temperature Hb of a fixing belt 71 in a width direction is detected.

The image forming apparatus 1 shown in FIG. 1 is an electrophotographic-type color printer including a printer engine 10 of a tandem type. The image forming apparatus 1 forms a color or monochrome image according to a print job input from an external host device.

The image forming apparatus 1 includes a control circuit 100 that controls its operation. A control circuit 100 includes a central processing unit (CPU), a random access memory (RAM), a read only memory (ROM), and a circuit that performs specific processing.

The printer engine 10 includes four imaging units 3y, 3m, 3c, and 3k, a print head 6, and an intermediate transfer belt 12.

Each of the imaging units 3y to 3k includes a photoreceptor 4 of a cylindrical shape, a charger 5 of a cylindrical shape, a developing device 7, a cleaner 8, and the like. The basic configurations of the imaging units 3y to 3k are similar to each other. Hereinafter, the imaging units 3y to 3k may be referred to as "imaging unit 3" without distinction.

The print head 6 emits a laser beam 6B for performing pattern exposure (latent image formation) to each of the imaging units 3y to 3k. In the print head 6, main scanning for deflecting the laser beam 6B in a rotation axis direction of the photoreceptor 4 is performed. In parallel with the main scanning, sub-scanning in which the photoreceptor 4 is rotated at a constant velocity is performed.

The intermediate transfer belt 12 is a member to be transferred in a primary transfer of a toner image. The intermediate transfer belt 12 is wound between a pair of rollers and rotates. Four primary transfer rollers 11 for applying a transfer voltage to the photoreceptor 4 of each imaging unit 3 are arranged inside the intermediate transfer belt 12.

In a color printing mode, the imaging units 3y to 3k form toner images of four colors yellow (Y), magenta (M), cyan (C), and black (K), respectively, in parallel. The toner images of the four colors are primarily transferred sequentially to the intermediate transfer belt 12 during rotation. First, the toner image of Y is transferred, and the toner image of M, the toner image of C, and the toner image of K are sequentially transferred so as to overlap the toner image of Y.

In a monochrome printing mode, the toner image of K is formed by the imaging unit 3k among the four imaging units 3y to 3k. The other imaging units 3y to 3c do not form toner images.

When the primarily-transferred toner image faces a secondary transfer roller 16, the primarily-transferred toner image is secondarily transferred to a sheet (recording medium) 9 taken out from a sheet feeding cassette 14 located below and conveyed through a timing roller 15. Thereafter, the sheet 9 passes through the inside of the fixing device 17 of a pad type and is sent to an upper discharge tray 19. When the sheet 9 passes through the fixing device 17, the toner image is fixed on the sheet 9 by heating and pressing.

The fixing apparatus 2 includes the fixing device 17 described above, a driving part 170 that supplies the fixing device 17 with driving force and electric power necessary for operation of the fixing device 17, a part of the control circuit 100 that controls the driving part 170, and the like.

Note that a form of conveyance of the sheet 9 in the image forming apparatus 1 is so-called "central paper feeding" in which the center of the sheet 9 is aligned with the center of a conveyance path in a width direction. As the sheet 9, sheets of various sizes can be used. For example, an A3 size (297 mm×420 mm) is assumed as the maximum size, and an official postal card size (100 mm×148 mm) is assumed as the minimum size.

As shown in FIG. 2, the fixing device 17 includes a fixing belt 71, a heating roller 72, a fixing heater 73, a pad 74, a pressure roller 75, and the like.

The fixing belt 71 is an endless belt-like rotating body formed by a heat-resistant resin as a base material. The fixing belt 71 is provided so as to go around the heating roller 72 and the pad 74 while contacting the heating roller 72 and the pad 74.

The heating roller 72 generates heat due to the fixing heater 73 incorporated as a heat source and heats the fixing belt 71 that contacts the peripheral surface of the heating roller 72. The fixing heater 73 includes, for example, a plurality of halogen lamps.

The pad 74 is a pressing member that presses the fixing belt 71 from the inside over the entire length of the fixing belt 71 in a width direction. The pad 74 is fixed to a stay 76 so as to face the pressure roller 75 via the fixing belt 71. The pad 74 includes, for example, a main body in which an elastic body is stacked on a rigid base and a sliding sheet covering the surface of the main body. A surface of the pad 74 that contacts the fixing belt 71 is a curved surface in which the downstream end of the sheet 9 in a conveyance direction protrudes from the upstream end thereof toward a side of the pressure roller 75 (right side in the figure). Thus, when the sheet 9 exits a fixing nip 79, the leading end of the sheet 9 is easily peeled off from the fixing belt 71, and the sheet 9 is less likely to be wound around the fixing belt 71.

Note that in the present specification, the fixing nip 79 means a structure configured to sandwich the sheet 9 for fixing. This does not mean a state in which the sheet 9 is sandwiched for fixing. There are a case where the sheet 9 is sandwiched by the fixing nip 79 and a case where the sheet 9 is not sandwiched.

The pressure roller 75 includes a core metal 75A of a cylindrical shape and an elastic body 75B that covers the peripheral surface of the core metal 75A. A material of the elastic body 75B is, for example, perfluoroalkoxyalkane (PFA). A dimension in a rotation axis direction is slightly longer than the width of the fixing belt 71. A diameter is, for example, about 40 to 50 mm.

The pressure roller 75 is supported so as to be movable by about several mm along a radial direction so that pressing force against the pad 74 can be adjusted according to the thickness of the sheet 9 or the like, and the pressure roller 75 is positioned with respect to the pad 74 by a pressure adjustment mechanism 178. As the pressure adjustment mechanism 178, a cam mechanism that rotationally moves the pressure roller 75 about an axis 178A parallel to a rotation axis of the pressure roller 75 can be used.

The pressure roller 75 is rotationally driven by a fixing motor 175. The rotational driving force of the fixing motor 175 is transmitted to the pressure roller 75 by a group of gears 177.

At the time of fixing when the sheet 9 passes through the inside of the fixing device 17, the pressure roller 75 rotates while pressing the sheet 9 against the pad 74. At this time, the elastic body 75B of the pressure roller 75 is deformed so as to be along the pad 74, and the fixing nip 79 that has a predetermined length and presses the sheet 9 is formed. The sheet 9 is conveyed by the rotation of the pressure roller 75, and the fixing belt 71 rotates by being dragged by the sheet 9. The heating roller 72 rotates with the fixing belt 71.

When the fixing belt 71 rotates, the fixing belt 71 slides with respect to the pad 74. Lubricant is applied to the inner peripheral surface of the fixing belt 71 in order to reduce sliding resistance. The fixing device 17 includes a lubricant reservoir 77 that replenishes the inner peripheral surface of the fixing belt 71 in order to delay the exhaustion of the lubricant.

The fixing device 17 includes a temperature sensor 78 that detects a temperature of the fixing belt 71 (hereinafter referred to as "belt temperature Hb") in order to perform feedback-type temperature adjustment control that keeps the fixing belt 71 at a target fixing temperature. The temperature sensor 78 is arranged so as to detect, for example, the belt temperature Hb when the fixing belt 71 contacts the heating roller 72. However, a position at which the belt temperature Hb of the fixing belt 71 in a circumferential direction is detected is not limited to this position, and the temperature sensor 78 may be arranged so as to detect the belt temperature Hb when the fixing belt 71 does not contact the heating roller 72.

The position at which the belt temperature Hb of the fixing belt 71 in the width direction is detected is determined as follows.

As shown in FIG. 3, a width W17 of the fixing belt 71 is selected so that, for example, both ends of the fixing belt 71 are protruded by about 5 mm from a width of the sheet 9 of the assumed maximum size (dimension in a direction orthogonal to the conveyance direction) W9max. Therefore, the outer peripheral surface of the fixing belt 71 can be divided into an area 701 and areas 702a and 702b. The area 701 is an area that contacts the sheet 9 in a case where the sheet 9 used for printing is the maximum size sheet. The areas 702a and 702b are areas that are located on both sides of the area 701 and that does not contact the sheet 9 regardless of the size of the sheet 9.

Furthermore, the area 701 is divided into an area 703 and areas 704a and 704b. The area 703 is an area that contacts the sheet 9 in a case where the sheet 9 is a sheet of the minimum size. The areas 704a and 704b are areas that are located on both sides of the area 703 and that does not contact the sheet 9 of the minimum size. The areas 704a and 704b are areas that contact only the sheet 9 of a size larger than the minimum size (including the maximum size).

In order to equalize the belt temperature Hb of the area that contacts the sheet 9 in the fixing belt 71, it is preferable to arrange the temperature sensor 78 so as to detect the belt temperature Hb of the area 701. Then, for example, in a case where the number of temperature sensors 78 is set to one in order to reduce a component cost, it is preferable to arrange the temperature sensor 78 in the area 704a or the area 704b of the area 701.

In a case where the belt temperature Hb of the areas 702a and 702b instead of in the area 701 is configured to be detected, the belt temperature Hb of the areas 702a and 702b tends to be higher than the belt temperature Hb of the area 701 because there is no heat absorption by the sheet 9 in the areas 702a and 702b. For this reason, it is difficult to improve the accuracy of the temperature adjustment control.

Additionally, in a case where the belt temperature Hb of the area 703 is configured to be detected, for example, even if the belt temperature Hb of the areas 704a and 704b is higher than the belt temperature Hb of the area 703 when a job using the sheet 9 of the minimum size continues, it is difficult to detect that the belt temperature Hb of the areas 704a and 704b is higher than the belt temperature Hb of the area 703. Therefore, it is possible that printing on the sheet 9 of a size other than the minimum size is performed in a state where there is a significant temperature difference between the area 703 and the areas 704a and 704b, and a printed matter with uneven fixing is output.

On the basis of on these matters, in the image forming apparatus 1, the temperature sensor 78 is arranged so as to detect the belt temperature Hb, for example, of the area 704a of the areas 704a and 704b. In an example shown in the figure, the temperature sensor 78 is arranged at a position nearer to the end edge of the area 704a on the outer side than the center thereof in the width direction.

Now, the image forming apparatus 1 has a function of suppressing the occurrence of the abnormal noise due to stick-slip in the fixing nip 79. Hereinafter, the configuration and operation of the image forming apparatus 1 will be described while focusing on the function.

Figure 4:
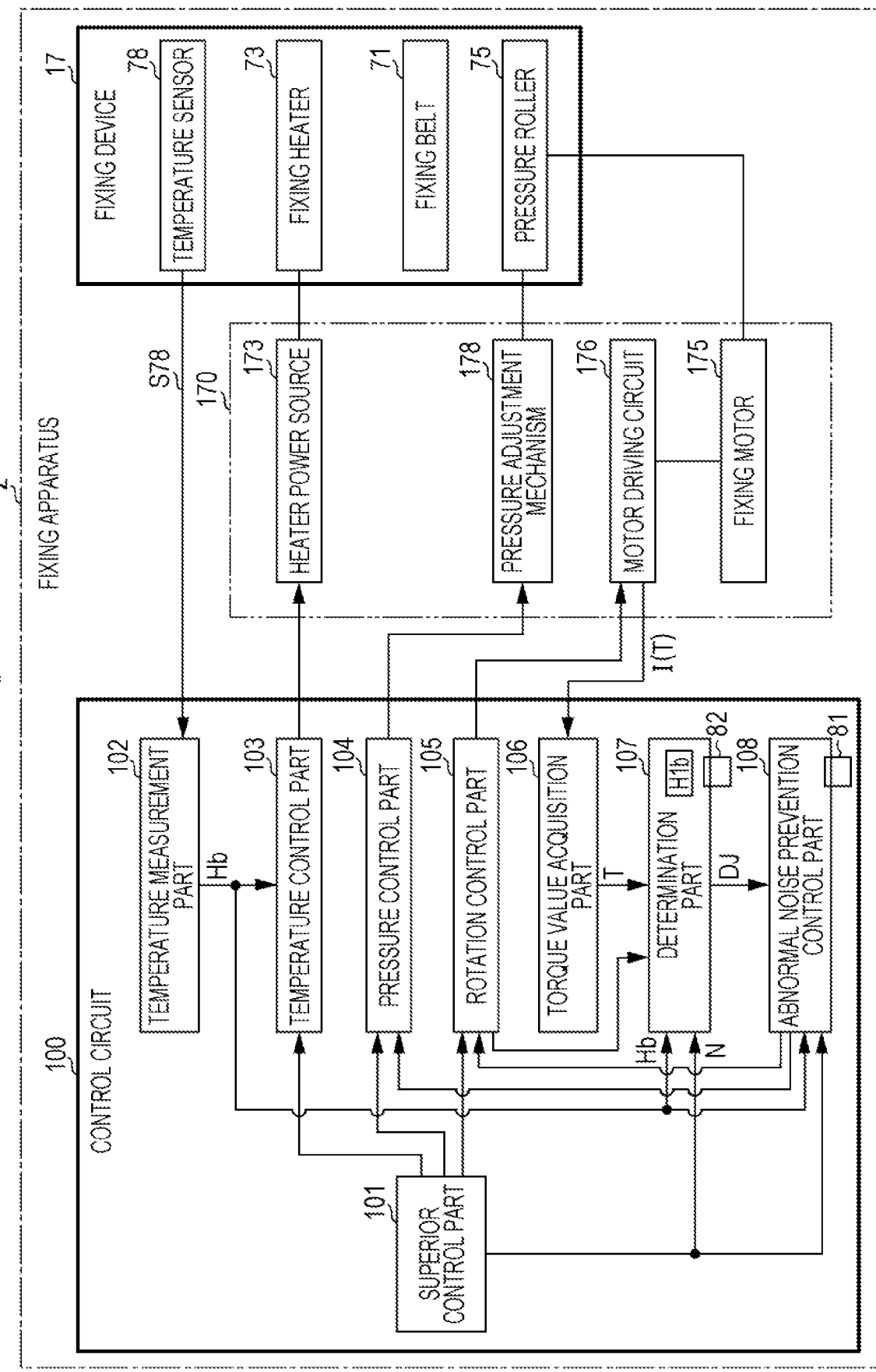
FIG. 4 is a diagram showing a configuration of a fixing apparatus.

FIG. 4 is a diagram showing a configuration of the fixing apparatus 2. The fixing apparatus 2 includes the fixing device 17, the driving part 170, and the control circuit 100. The configuration of the fixing device 17 is as described above.

The driving part 170 includes a heater power source 173 that supplies power to the fixing heater 73, the fixing motor 175 described above, a motor drive circuit 176 that drives the fixing motor 175, and the pressure adjustment mechanism 178 described above.

The control circuit 100 includes a superior control part 101, a temperature measurement part 102, a temperature control part 103, a pressure control part 104, a rotation control part 105, and the like. In addition, the control circuit 100 includes a torque value acquisition part 106, a determination part 107, and an abnormal noise prevention control part 108 as constituent components closely related to the function of suppressing the occurrence of the abnormal noise. These functions are achieved by a hardware configuration of the control circuit 100, by a control program being executed by the CPU, or by a combination thereof.

The superior control part 101 is a controller that is responsible for overall control of the image forming apparatus 1. When executing the print job, the superior control part 101 gives a command for performing fixing under conditions according to the print job to the temperature control part 103, the pressure control part 104, and the rotation control part 105. The command includes information such as a system velocity (linear velocity V at the time of printing) that regulates a conveyance velocity of the sheet 9 and a peripheral velocity of the photoreceptor 4, a size of the sheet 9 used for printing, a type of the sheet 9, and the target fixing temperature (target value of temperature control at the time of fixing). The type of the sheet 9 is classified by a thickness, a basis weight, glossiness, and the like and is input by a user or detected using a predetermined sensor.

The system velocity is switched by the superior control part 101 according to the type of sheet 9 and other printing conditions. For example, in a case where monochrome printing is performed using plain paper as the sheet 9, the system velocity is, for example, the maximum velocity (full velocity Vfull). In a case where color printing is performed using plain paper, the system velocity is, for example, 90% of the maximum velocity. In a case where thick paper is used as the sheet 9, the system velocity is, for example, 50% of the maximum velocity (half velocity) regardless of the monochrome printing or the color printing.

The target fixing temperature is switched according to the type of the sheet 9. For example, in the case where thick paper is used as the sheet 9, the target fixing temperature is set to a higher temperature than a temperature in the case where plain paper is used. However, the system velocity is related to the setting of the target fixing temperature, and in the case where thick paper is used, the target fixing temperature may be set to a lower temperature than the temperature in the case where plain paper is used, depending on the setting of the system velocity.

When the execution of all print jobs to be executed is completed, the superior control part 101 commands the rotation control part 105 to stop the rotation. When the image forming apparatus 1 shifts to a power saving mode, the superior control part 101 commands the temperature control part 103 to stop heating or to decrease a temperature that is kept.

Additionally, each time a print job is executed, the superior control part 101 integrates, for example, the number of printed sheets or the number of executed print jobs since the use of the image forming apparatus 1 is started, as the control information of the image forming apparatus 1 and stores the latest integrated value. This integrated value is notified to the determination part 107 as a cumulative usage amount N of the fixing device 17.

The temperature measurement part 102 measures the belt temperature Hb on the basis of a detection signal S78 from the temperature sensor 78.

The temperature control part 103 controls the output of the heater power source 173 while monitoring the belt temperature Hb so that the temperature of the area of the fixing belt 71 that contacts the sheet 9 is raised to the target fixing temperature and kept at the target fixing temperature.

The pressure control part 104 controls the pressure adjustment mechanism 178 so that appropriate pressure according to the basis weight of the sheet 9 is applied to the sheet 9 in the print job.

The rotation control part 105 controls the motor drive circuit 176 so that the fixing motor 175 rotates at a rotation velocity according to the system velocity.

Additionally, when the rotation control part 105 is commanded by the superior control part 101 to stop the rotation, the rotation control part 105 controls the motor drive circuit 176 so as to rotate the pressure roller 75 at a low velocity for a time duration of, for example, about up to 60 seconds in order to prevent overshoot of the belt temperature Hb. The motor drive circuit 176 is controlled to stop. The pressure roller 75 abuts on the fixing belt 71 at the time of low-velocity rotation.

The rotation velocity at the time of low-velocity rotation is preferably about 20 to 30% of the full velocity Vfull in terms of the system velocity. In order to suppress an increase in a travel distance related to the lives of the pressure roller 75 and the fixing belt 71, it is preferable to rotate at a slower velocity. However, if the velocity is too slow, it is difficult to prevent the overshoot.

The torque value acquisition part 106 acquires, as a torque value T indicating a magnitude of torque of the fixing motor 175, a drive current value I that is a measured value of a motor current flowing through a winding wire (coil) of the fixing motor 175 from the motor drive circuit 176.

Note that instead of using the drive current value I as the torque value T, a torque conversion can be performed by multiplying the drive current value I by a motor constant specific to the fixing motor 175, and a result of the torque conversion can be used as the torque value T. When performing the torque conversion, a correction according to the temperature, the rotation velocity and the like of the fixing motor 175 may be performed as necessary.

On the basis of a plurality of condition values including the torque value T, the determination part 107 determines whether a state of the fixing nip 79 is a state in which the abnormal noise occurs. The determination part 107 performs this determination when control that rotates the fixing belt 71 at a constant velocity slower than a velocity at the time of fixing (printing operation) in which the sheet 9 is heated is performed, that is, for example, at the time of low-velocity rotation in order to prevent the overshoot as described above.

The plurality of condition values is the drive current value I as the torque value T and the belt temperature Hb. Alternatively, the plurality of condition values is the drive current value I and the cumulative usage amount N. Alternatively, the plurality of condition values is the drive current value I, the belt temperature Hb, and the cumulative usage amount N.

Details of the determination by the determination part 107 will be described later.

In a case where the abnormal noise prevention control part 108 is notified of a determination result DJ that the abnormal noise occurs by the determination part 107, the abnormal noise prevention control part 108 performs abnormal noise prevention control. The abnormal noise prevention control is control that gives, to the rotation control part 105, a command to increase the rotation of the pressure roller 75 and the fixing belt 71 or control that give, to the pressure control part 104, a command to weaken the pressing applied by the pressure roller 75 to the fixing belt 71.

Figures 5, 6:
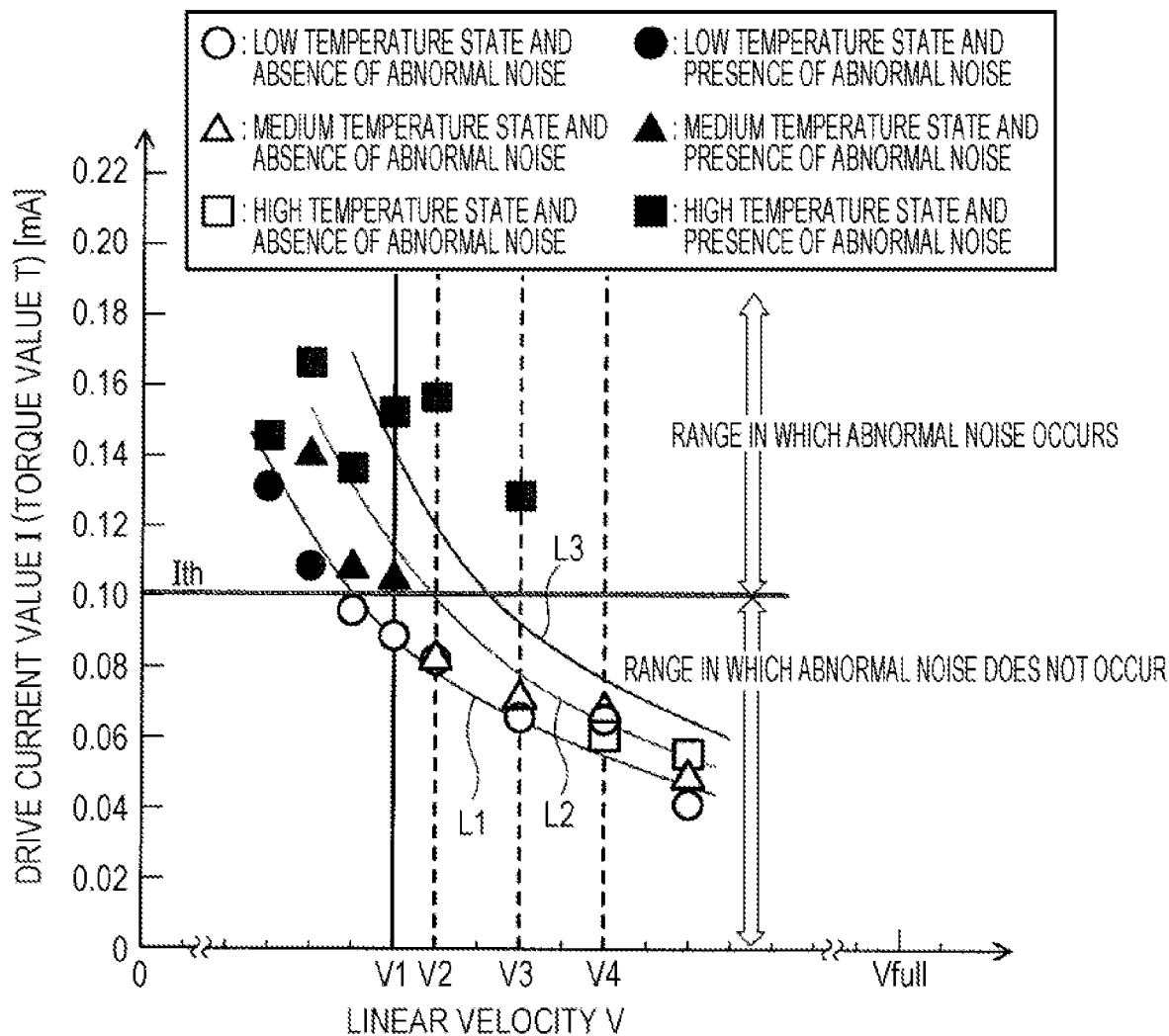
FIG. 5 is a graph showing relationship between a linear velocity, a drive current value, and the presence or absence of an occurrence of an abnormal noise.
FIG. 6 is a diagram showing an example of a table used for switching the linear velocity.

FIG. 5 is a graph showing relationship between the linear velocity V, the drive current value I, and the presence or absence of the occurrence of the abnormal noise. FIG. 6 is a diagram showing an example of a table 81 used for switching the linear velocity V.

In FIG. 5, the linear velocity V on the horizontal axis is a peripheral velocity of the fixing belt 71 and the pressure roller 75 in the fixing nip 79.

A white circle (○) represents a condition under which the abnormal noise does not occur in a "low temperature state" (combination of the linear velocity V and the drive current value I). A black circle (●) represents a condition under which the abnormal noise occurs in the same "low temperature state."

A white square mark (□) represents a condition under which the abnormal noise does not occur in a "high temperature state." A black square mark (■) represents a condition under which the abnormal noise occurs in the "high temperature state."

A white triangle mark (△) represents a condition under which the abnormal noise does not occur in a "medium temperature state." A black triangle mark (▲) represents a condition in which the abnormal noise occurs in the "medium temperature state."

The low temperature state is a state in which temperatures of both the fixing belt 71 and the pressure roller 75 have risen to the lowest temperature H1 among options of the target fixing temperature selected according to the print job. The high temperature state is a state in which the temperature has risen to the highest temperature H3 among the options of the target fixing temperature, and the medium temperature state is a state in which the temperature has risen to a temperature H2 approximately between the temperature H1 and the temperature H3.

Additionally, a curve L1, a curve L2, and a curve L3 in this order in the figure are approximate curves showing relationship between the linear velocity V and the drive current value I in the low temperature state, the medium temperature state, and the high temperature state, respectively.

FIG. 5 is created on the basis of a result of an experiment in which the image forming apparatus 1 is operated as follows.

The image forming apparatus 1 is caused to perform interval operation that intermittently repeats a job that prints an image on one side of about two to four sheets 9 for several hours. An interval between the job and the next job is made longer than time required for the job, and even in the interval, the temperature adjustment control is performed so as to keep the fixing belt 71 at the target fixing temperature continuously after the job. In other words, the temperature of the pressure roller 75 is actively raised in an interval in which the fixing belt 71 and the pressure roller 75 directly abut on each other. Additionally, even in the interval, the pressure roller 75 and the fixing belt 71 are rotated at the same velocity as a velocity during the execution of the job.

When several hours have elapsed from the start of the interval operation, the temperature of the elastic body 75B of the pressure roller 75 rises substantially to the target fixing temperature and the temperature of the core metal 75A also rises to a temperature close to the target fixing temperature. Therefore, by setting the target fixing temperature to the temperature H1, the temperature H2, or the temperature H3 and causing the image forming apparatus 1 to perform the interval operation, the state of the fixing nip 79 can be set, respectively, to the low temperature state, the medium temperature state, or the high temperature state. When the target fixing temperature is set to a temperature between the temperature H1 and the temperature H2, or a temperature between the temperature H2 and the temperature H3, a state in which the temperature of the pressure roller 75 has risen to the target fixing temperature is obtained.

With the temperature of the pressure roller 75 raised to the target fixing temperature in this way, the linear velocity V is switched from a velocity at the time of printing (for example, the full velocity Vfull) to a slower velocity (for example, a standard low-velocity rotation velocity V1 that is 30% of the full velocity Vfull). The drive current value I is measured in a state where constant velocity rotation control is performed with respect to the fixing motor 175 so as to keep the slow velocity, and a magnitude and frequency of vibrations of the pressure roller 75 are measured.

The linear velocity V is switched stepwise within a range slower than the velocity at the time of printing, and each time the linear velocity V is switched, similar measurement is performed.

Then, for each linear velocity V, the presence or absence of the occurrence of the abnormal noise (the presence of the abnormal noise or the absence of the abnormal noise) is determined on the basis of a measured value of the vibration. Specifically, in a case where vibrations at a human audible frequency (20 to 20000 Hz) and with a magnitude of an audible level occur, the presence of the abnormal noise is determined, and in a case where such vibrations do not occur, the absence of the abnormal noise is determined.

Results of performing such measurement and determination for each of the low temperature state, the medium temperature state, and the high temperature state are shown in FIG. 5.

According to FIG. 5, in a case where the linear velocity V is equal to or lower than a velocity V3, the abnormal noise occurs, and in a case where the linear velocity V is equal to or higher than a velocity V4, the abnormal noise does not occur. The velocity V3 and the velocity V4 are, respectively, about 43% and about 52% of the full velocity Vfull, and are faster than the standard low-velocity rotation velocity V1 (30% of the full velocity Vfull).

It can be seen that there is a boundary (threshold value Ith) of the drive current value I at which a case where the abnormal noise occurs and a case where the abnormal noise does not occur are separated. That is, the case where the abnormal noise occurs is limited to a case where the drive current value I exceeds the threshold value Ith (about 0.10 mA in an example in the figure), and in a case where the drive current value I is less than the threshold value Ith, the abnormal noise does not occur.

Additionally, as shown by the curves L1, L2, and L3, the drive current value I tends to increase as the temperature of the pressure roller 75 increases (that is, in the order of the low temperature state, the medium temperature state, and the high temperature state). This is thought to be because a diameter of the pressure roller 75 increases due to thermal expansion and pressing force against the fixing belt 71 increases.

In particular, in a configuration in which a sliding surface of the pad 74 is a curved surface as described above, the pressure roller 75 bites into the end of the pad 74 due to the thermal expansion and sliding resistance increases. Therefore, it is considered that the drive current value I (that is, the torque value T) tends to increase due to temperature rising.

From the results shown in FIG. 5, it can be seen that, as a countermeasure against the abnormal noise at the time of 1 low-velocity rotation, the linear velocity V may be preferably changed from the standard low-velocity rotation velocity V1 to a velocity at which the abnormal noise does not occur within a range faster than the standard low-velocity rotation velocity V1. Alternatively, the pressing of the pressure roller 75 against the fixing belt 71 may be weakened so that the drive current value I is equal to or less than the threshold value Ith. Alternatively, both of these countermeasures may be taken.

For example, in a case where the linear velocity V is changed, the linear velocity is changed in a way described below in details.

In normal use of the image forming apparatus 1 by the user, the temperature of the pressure roller 75 hardly raises to the belt temperature Hb. However, as a countermeasure against the abnormal noise, it may be preferable to determine whether the linear velocity V may need to be changed on the assumption that the temperature of the pressure roller 75 has risen to the belt temperature Hb. If the abnormal noise does not occur in a state in which the temperature of the pressure roller 75 has risen to the belt temperature Hb, the abnormal noise does not occur when an actual temperature of the pressure roller 75 is lower than the belt temperature Hb. Therefore, a wrong determination is not made.

According to FIG. 5, when the linear velocity V is the standard low-velocity rotation velocity V1, the abnormal noise does not occur in the case of the low temperature state, but the abnormal noise occurs in the case of the medium temperature state.

Therefore, when the belt temperature Hb measured using the temperature sensor 78 is equal to or lower than the temperature H1 of the low temperature state, the linear velocity V does not need to be increased and the standard low-velocity rotation velocity V1 may be preferably maintained.

If the belt temperature Hb is, for example, the temperature H2 of the medium temperature state, the linear velocity V may need to be increased to a velocity V2 or higher at which the abnormal noise does not occur. The velocity V2 in FIG. 5 is about 35% of the full velocity Vfull. When the linear velocity V is increased to, for example, the velocity V2, a subsequent occurrence of the abnormal noise can be suppressed.

If the belt temperature Hb is the temperature H3 of the high temperature state, the linear velocity V may need to be increased to the velocity V4 or higher. When the linear velocity V is increased to, for example, the velocity V4, a subsequent occurrence of the abnormal noise can be suppressed.

FIG. 5 shows the presence or absence of the occurrence of an abnormal noise in three states of low, medium, and high, but preferably, an experiment is conducted to check the presence or absence of the abnormal noise by finely switching the temperature to four or more levels. As a result, a temperature H1b is specified more precisely and the table 81 is created and is stored in the control circuit 100. The temperature H1b is the lowest temperature at which the abnormal noise at the standard low-velocity rotation velocity V1 occurs. As shown in FIG. 6, the table 81 associates a temperature range of the belt temperature Hb with a preferable linear velocity V at which the abnormal noise does not occur.

The determination part 107 determines that the abnormal noise occurs in a case where the drive current value I exceeds the threshold value Ith and the belt temperature Hb is equal to or higher than the temperature H1b.

The abnormal noise prevention control part 108 reads the preferable linear velocity V associated with the temperature range including the belt temperature Hb from the table 81 and commands the rotation control part 105 to switch to the read preferable linear velocity V.

Figure 7A:
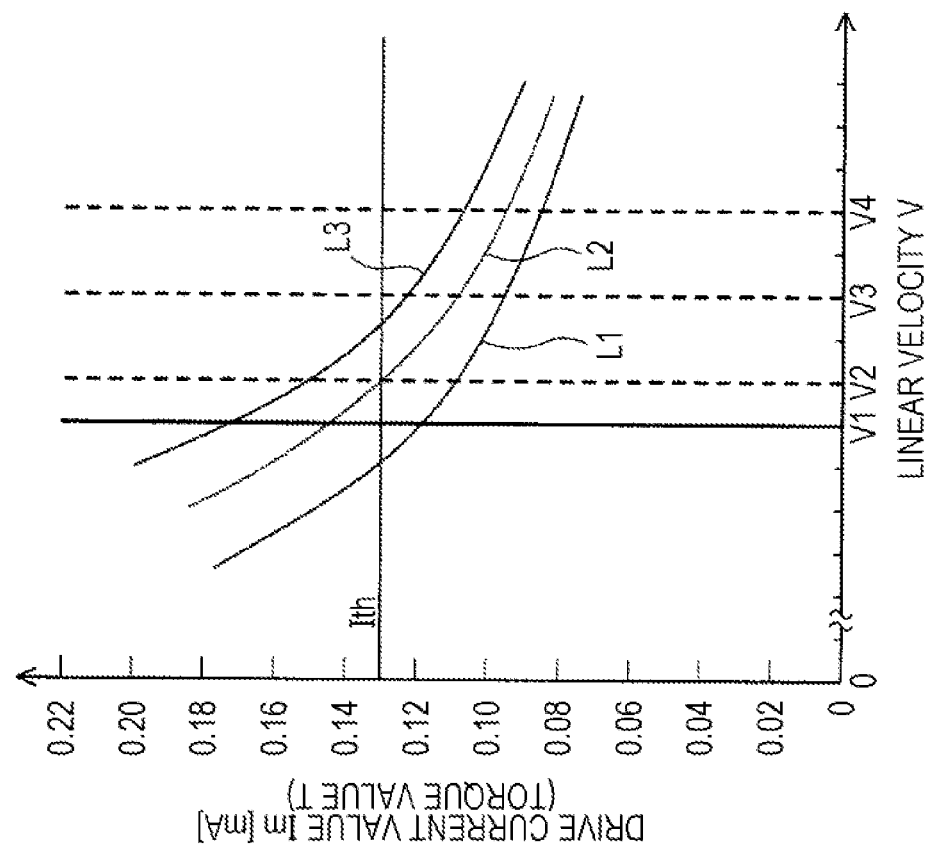
FIGS. 7A and 7B are graphs showing a trend of a temporal change in the relationship between the linear velocity, the drive current value, and the presence or absence of the occurrence of the abnormal noise.
Figure 7B:
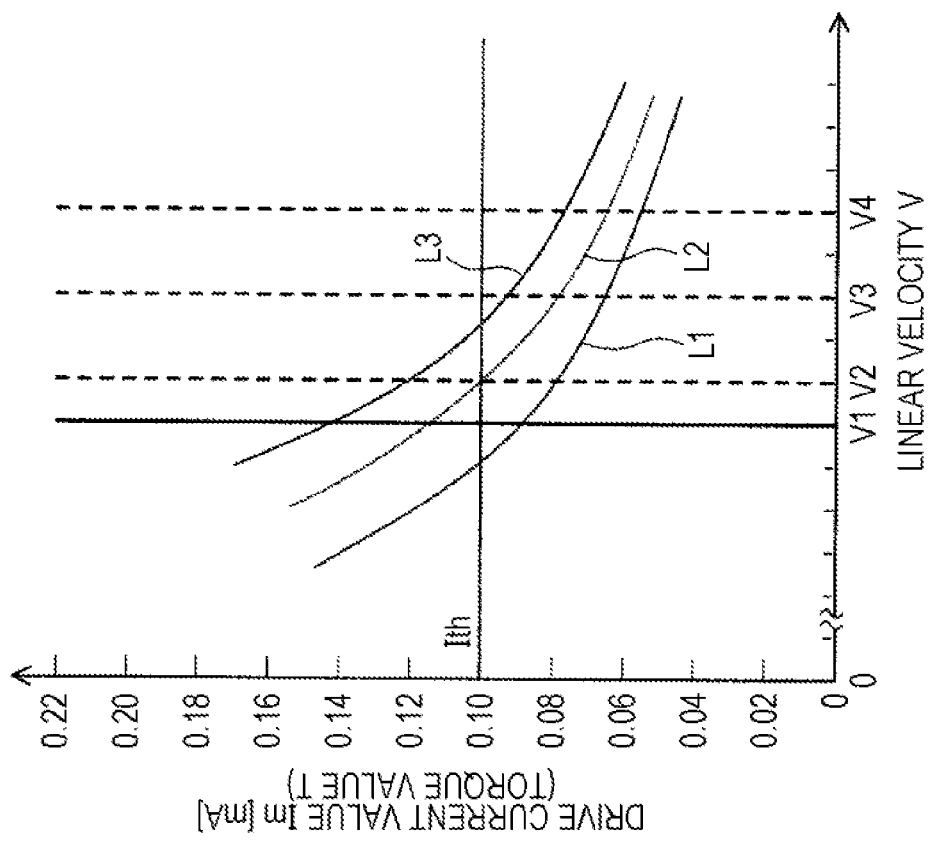

FIGS. 7A and 7B are graphs showing a trend of a temporal change in the relationship between the linear velocity V, the drive current value I, and the presence or absence of the occurrence of the abnormal noise. FIG. 7A shows the relationship at an initial stage of use of the fixing belt 71 (at a stage of 25% or less of the life), and FIG. 7B shows the relationship at an end stage (at a stage of 75% or more of the lifetime). Additionally, FIG. 8 is a diagram showing an example of a table 82 used for determining whether the abnormal noise occurs.

As can be seen from a comparison between FIG. 7A and FIG. 7B, there is a temporal change in which the threshold value Ith of the drive current value I increases due to the use of the fixing belt 71. The threshold value Ith is a threshold value at which the case where the abnormal noise occurs and the case where the abnormal noise does not occur are separated. This is thought to be because the sliding resistance between the fixing belt 71 and the pressure roller 75 gradually increases due to wear of the peripheral surfaces of the fixing belt 71 and the pressure roller 75.

Therefore, as shown in FIG. 8, the table 82 indicating the threshold value Ith for each stage of a temporal change divided by the cumulative usage amount N is created and stored in the control circuit 100. When the determination part 107 determines whether the abnormal noise occurs, the determination part 107 reads, from the table 81, the threshold value Ith corresponding to the cumulative usage amount N acquired from the superior control part 101 and then compares the threshold value Ith with the drive current value I.

Figure 9:
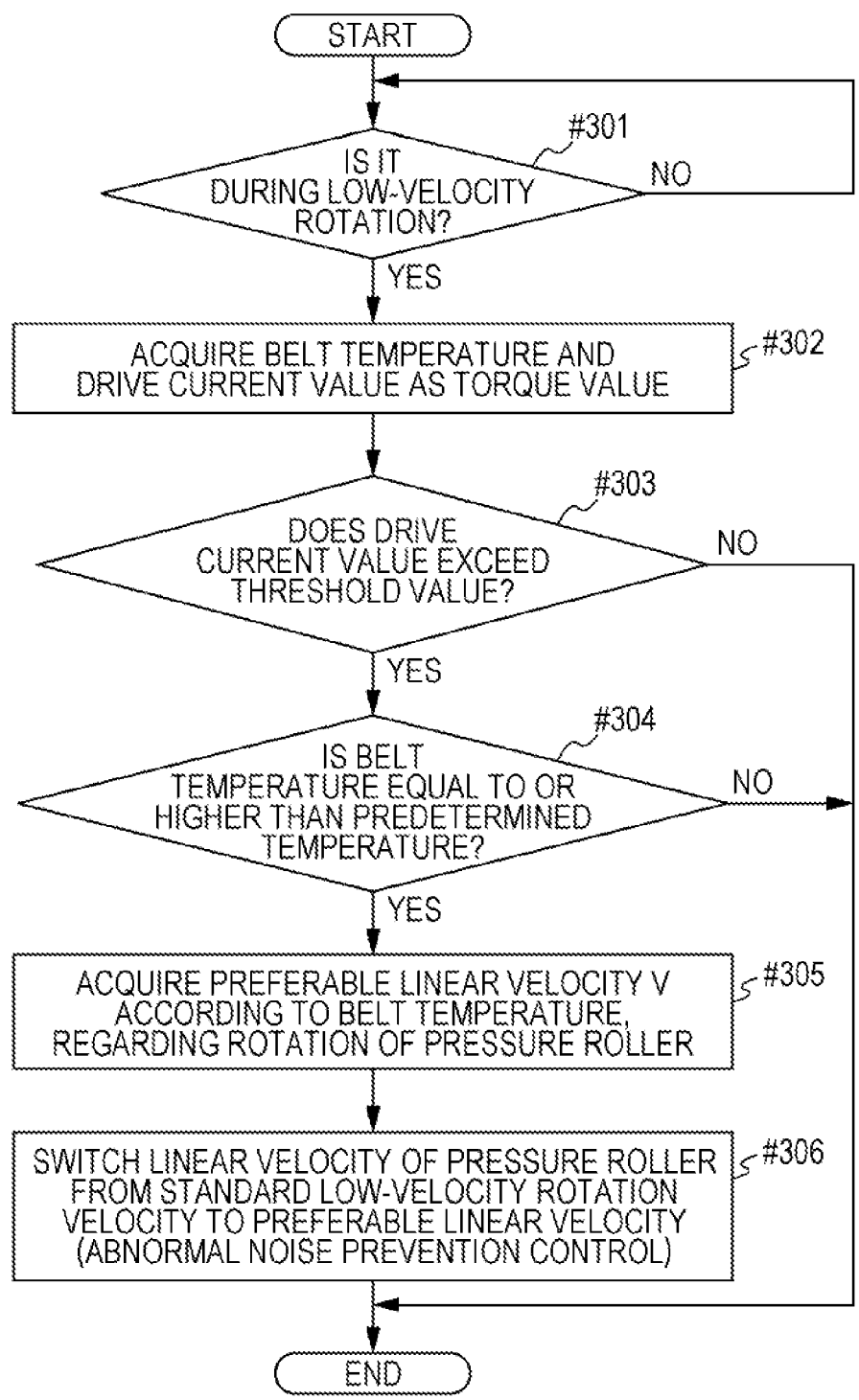
FIG. 9 is a diagram showing a first example of a flow of processing for suppressing the occurrence of the abnormal noise in the fixing apparatus.

FIG. 9 is a diagram showing a first example of a flow of processing for suppressing the occurrence of the abnormal noise in the fixing apparatus 2.

During low-velocity rotation (YES in #301), the belt temperature Hb and the drive current value I as the torque value T are acquired (#302).

As a determination as to whether the abnormal noise occurs, for example, first, it is checked whether the drive current value I exceeds the threshold value Ith (#303). In a case where the drive current value I does not exceed the threshold value Ith (NO in #303), it is determined that the abnormal noise does not occur and the processing of FIG. 9 is terminated.

In a case where the drive current value I exceeds the threshold value Ith (YES in #303), next, it is checked whether the belt temperature Hb is equal to or higher than the lowest temperature H1b at which the abnormal noise occurs (#304). Even in a case where the belt temperature Hb is not equal to or higher than the temperature H1b (NO in #304), it is determined that the abnormal noise does not occur and the processing of FIG. 9 is terminated.

Meanwhile, in a case where the belt temperature Hb is equal to or higher than the temperature H1b (YES in #304), it is determined that the abnormal noise occurs and the processing proceeds to step #305.

In step #305, the preferable linear velocity V according to the belt temperature Hb is acquired from the table 81, regarding the rotation of the pressure roller.

Then, the abnormal noise prevention control that switches the linear velocity V of the pressure roller 75 from the standard low-velocity rotation velocity V1 to the preferable linear velocity V is performed (#306).

Figure 10:
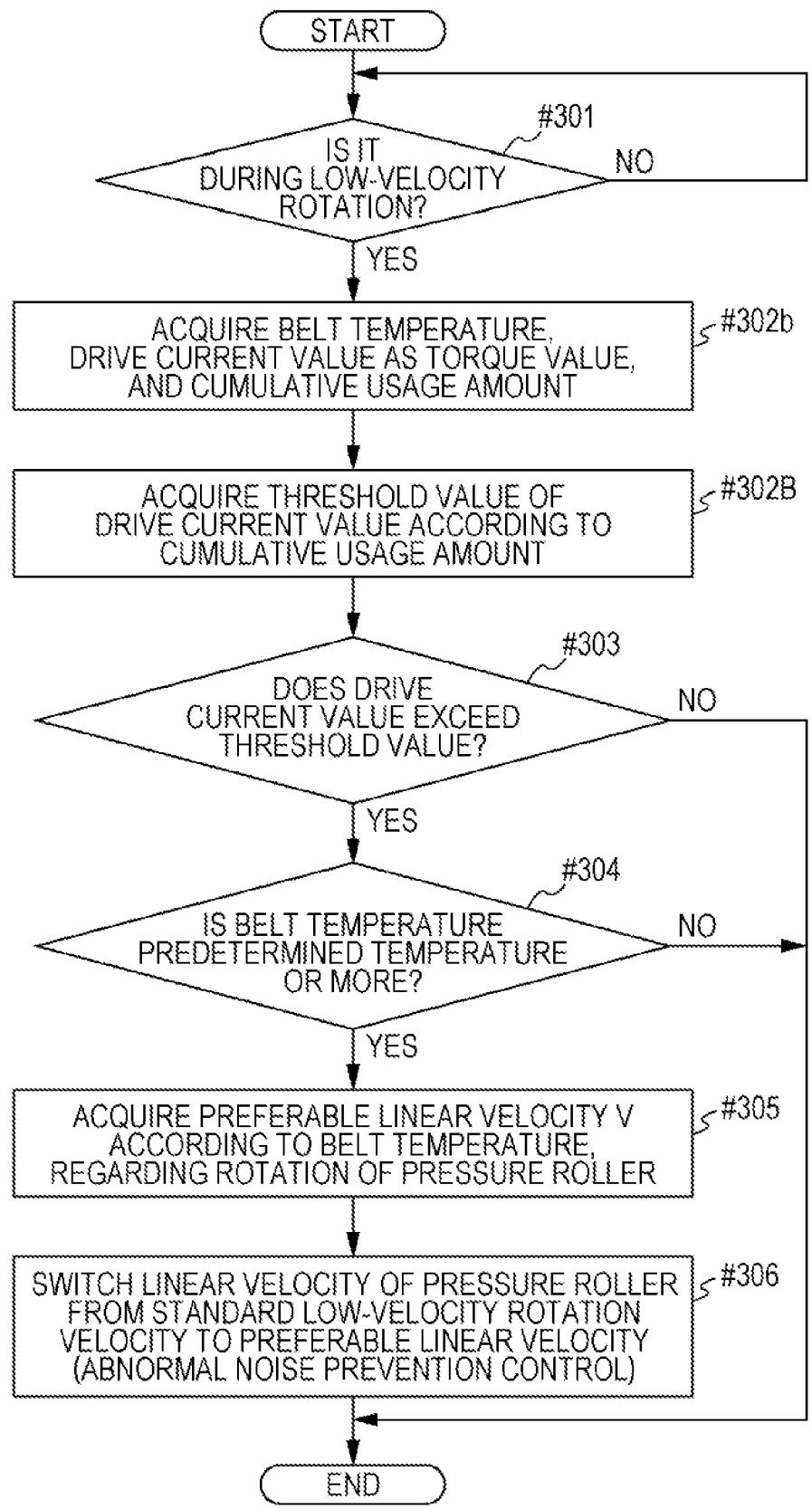
FIG. 10 is a diagram showing a second example of the flow of the processing for suppressing the occurrence of the abnormal noise in the fixing apparatus.

FIG. 10 is a diagram showing a second example of the flow of the processing for suppressing the occurrence of the abnormal noise in the fixing apparatus 2.

During the low-velocity rotation (YES in #301), the belt temperature Hb, the drive current value I as the torque value T, and the cumulative usage amount N are acquired (#302b). Subsequently, the threshold value Ith of the drive current value I according to the cumulative usage amount N is acquired from the table 82 (#302B).

Thereafter, the same processing (#303 to #306) as in an example of FIG. 9 is executed.

Figure 11:
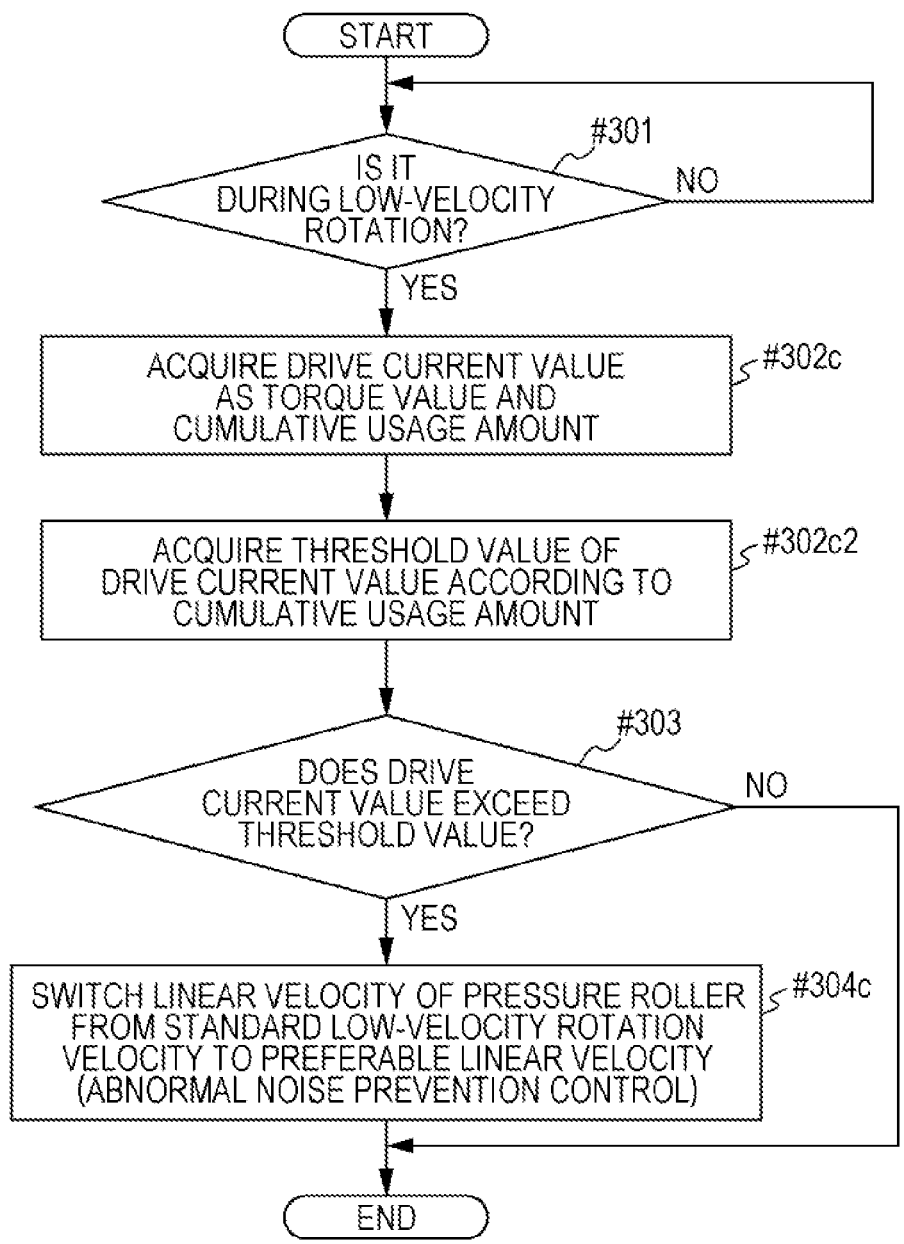
FIG. 11 is a diagram showing a third example of the flow of the processing for suppressing the occurrence of the abnormal noise in the fixing apparatus.

FIG. 11 is a diagram showing a third example of the flow of the processing for suppressing the occurrence of the abnormal noise in the fixing apparatus 2.

During the low-velocity rotation (YES in #301), the drive current value I as the torque value T and the cumulative usage amount N are acquired (#302c). Subsequently, the threshold value Ith of the drive current value I according to the cumulative usage amount N is acquired from the table 82 (#302c2).

As a determination as to whether the abnormal noise occurs, it is checked whether the drive current value I exceeds the threshold value Ith (#303). In a case where the drive current value I does not exceed the threshold value Ith (NO in #303), it is determined that the abnormal noise does not occur and the processing of FIG. 11 is terminated.

In a case where the drive current value I exceeds the threshold value Ith (YES in #303), it is determined that the abnormal noise occurs and the processing proceeds to step #304c.

In step #304c, the abnormal noise prevention control that switches the linear velocity V of the pressure roller 75 from the standard low-velocity rotation velocity V1 to the preferable linear velocity V is performed.

Figure 12:
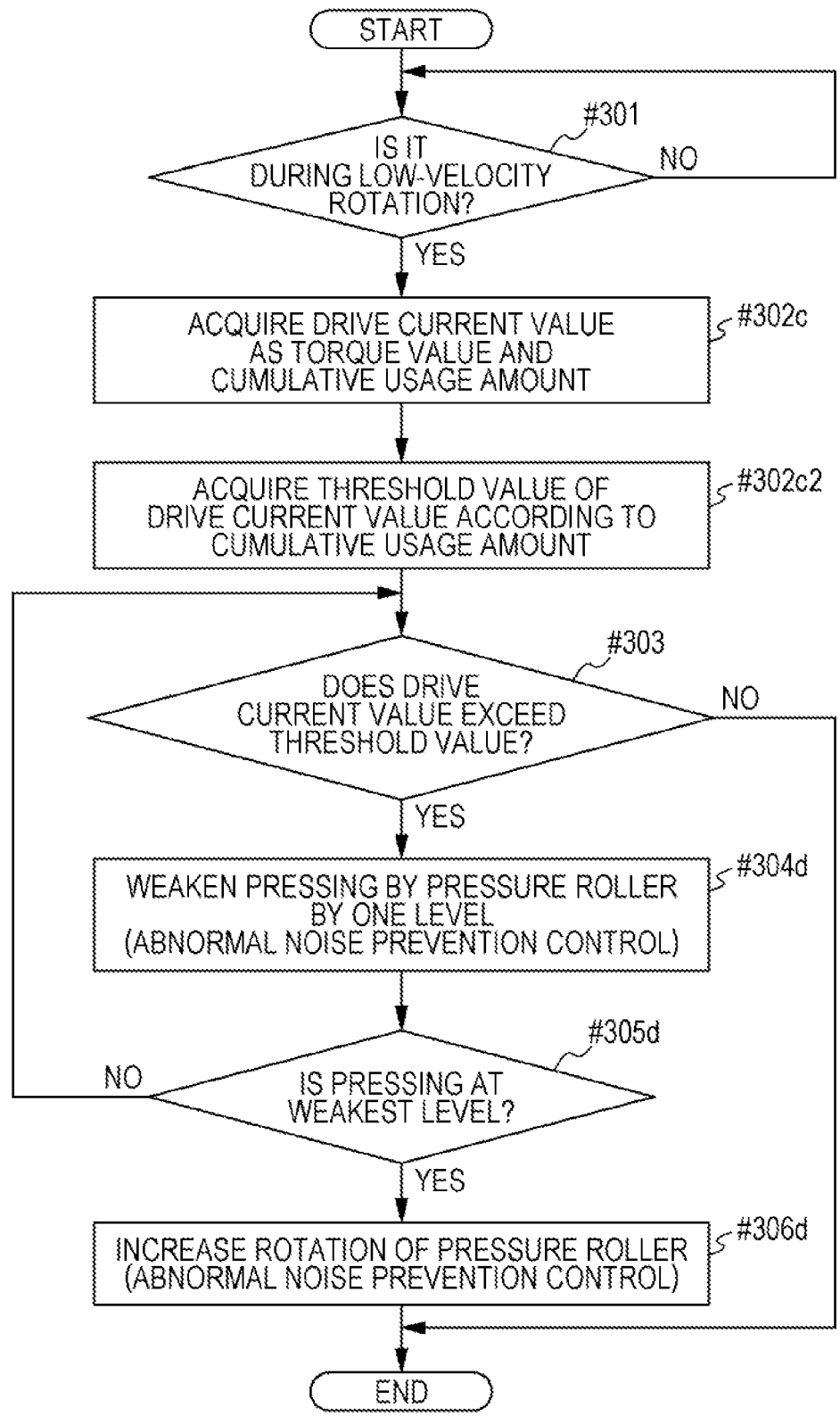
FIG. 12 is a diagram showing a fourth example of the flow of the processing for suppressing the occurrence of the abnormal noise in the fixing apparatus.

FIG. 12 is a diagram showing a fourth example of the flow of the processing for suppressing the occurrence of the abnormal noise in the fixing apparatus 2.

As in an example of FIG. 11, during the low-velocity rotation (YES in #301), the drive current value I as the torque value T and the cumulative usage amount N are acquired (#302c), and the threshold value Ith of the drive current value I according to the cumulative usage amount N is acquired from the table 82 (#302c2).

As a determination as to whether the abnormal noise occurs, it is checked whether the drive current value I exceeds the threshold value Ith (#303). In a case where the drive current value I does not exceed the threshold value Ith (NO in #303), it is determined that the abnormal noise does not occur and the processing of FIG. 12 is terminated.

In a case where the drive current value I exceeds the threshold value Ith (YES in #303), it is determined that the abnormal noise occurs and the processing proceeds to step #304d.

In step #304d, the pressure adjustment mechanism 178 is operated so as to weaken the pressing applied by the pressure roller 75 to the fixing belt 71 by one level as the abnormal noise prevention control. Then, it is checked whether the pressing is at the weakest level (#305d).

In a case where the pressing is not at the weakest level (NO in #305d), the processing returns to step #303 to check again whether the drive current value I exceeds the threshold value Ith. In a case where the drive current value I exceeds the threshold value Ith even if the pressing is weakened by one level (YES in #303), the pressing is further weakened by one level (#304d).

In a case where the drive current value I exceeds the threshold value Ith even if the pressing is weakened to the weakest level (YES in #303, YES in #304d and #305d), the rotation of the pressure roller 75 is increased (#306d). In this case, for example, even if the belt temperature Hb is the highest temperature H3, the linear velocity V of the pressure roller 75 is switched to a velocity V4 at which the abnormal noise does not occur.

According to the above embodiment, it is possible to suppress the occurrence of the abnormal noise due to stick-slip at the fixing nip 79. In a case where the occurrence of the abnormal noise is suppressed by increasing the linear velocity V, the linear velocity V is switched to a slower linear velocity V within a range in which the abnormal noise does not occur. Therefore, an increase in the travel distance due to increasing the linear velocity V is reduced and the shortening of the life of the fixing device 17 is suppressed.

According to the embodiment described above, since it is determined whether the linear velocity V may need to be increased on the basis of the plurality of condition values such as the drive current value I and the belt temperature Hb, it becomes easy to narrow down the case where the linear velocity V is increased, compared with a case where it is determined whether the linear velocity V may need to be increased on the basis of only a single condition value. Thus, it is less likely that the travel distance is increased by unnecessarily increasing the linear velocity V.

According to the embodiment described above, the belt temperature Hb of the area 704a (or 704b) that contacts only the sheet 9 of a size larger than the minimum size in the fixing belt 71 is measured. Therefore, it is possible to increase the accuracy of detecting the occurrence of the abnormal noise, compared with a case where the belt temperature Hb of the other areas is measured.

In the embodiment described above, in a case where the linear velocity V of the pressure roller 75 is switched, the linear velocity V may be switched to the slowest linear velocity V within the range in which the abnormal noise does not occur among options of the system velocity.

The configuration of the whole or each part of each of the image forming apparatus 1 and the fixing apparatus 2, the contents, order or timing of the processing, the contents of the tables 81 and 82, and the like can be appropriately changed in accordance with the spirit of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. A fixing apparatus, comprising:
    a first rotating body that contacts a sheet for printing and heats the sheet;
    a second rotating body that rotates while pressing the first rotating body;
    a motor that rotates the second rotating body; and
    a hardware processor that determines whether an abnormal noise occurs on the basis of a plurality of condition values including a torque value of the motor, wherein
    the hardware processor performs abnormal noise prevention control that increases the rotation of the first rotating body or weakens pressing applied by the second rotating body to the first rotating body in a case where it is determined that the abnormal noise occurs.

2. The fixing apparatus according to claim 1, wherein
    the hardware processor acquires the torque value by acquiring a measured value of a motor current that drives the motor and
    determines whether the abnormal noise occurs on the basis of the plurality of condition values including the torque value acquired by the torque value acquisition part.

3. The fixing apparatus according to claim 1, wherein
    the plurality of condition values is the torque value and a temperature of the first rotating body.

4. The fixing apparatus according to claim 1, wherein
    the plurality of condition values is the torque value and a cumulative usage amount of the first rotating body.

5. The fixing apparatus according to claim 1, wherein the plurality of condition values is the torque value, the temperature of the first rotating body, and the cumulative usage amount of the first rotating body.

6. The fixing apparatus according to claim 3, wherein the temperature is a temperature of a part of the first rotating body, the part contacting the sheet in a case where the sheet is a sheet of an assumed maximum size, the part not contacting the sheet in a case where the sheet is a sheet of an assumed minimum size.

7. The fixing apparatus according to claim 1, wherein when the first rotating body is rotating at a constant velocity that is a velocity slower than a velocity at the time of fixing operation that heats the sheet, the determination part determines whether the abnormal noise occurs on the basis of the plurality of condition values at that time.

8. The fixing apparatus according to claim 1, further comprising:
a heat source for heating the sheet; and
a pad for forming a fixing nip, wherein
the first rotating body is an endless belt heated by the heat source while going around the pad; and
the second rotating body is a roller that presses the first rotating body against the pad.

9. An image forming apparatus, comprising the fixing apparatus according to claim 1, wherein
the image forming apparatus uses the fixing apparatus to fix an image on the sheet and output the image.

10. A method of controlling a fixing apparatus including a first rotating body that contacts a sheet for printing and heats the sheet, a second rotating body that rotates while pressing the first rotating body, and a motor that rotates the second rotating body, the method comprising:
determining whether an abnormal noise occurs on the basis of a plurality of condition values including a torque value of the motor; and
performing abnormal noise prevention control that increases the rotation of the first rotating body or weakens pressing applied by the second rotating body to the first rotating body in a case where it is determined that the abnormal noise occurs.

11. A non-transitory recording medium storing a computer readable program used in a computer that controls a fixing apparatus including a first rotating body that contacts a sheet for printing and heats the sheet, a second rotating body that rotates while pressing the first rotating body, and a motor that rotates the second rotating body, the non-transitory recording medium causing the computer to perform:
determining that determines whether an abnormal noise occurs on the basis of a plurality of condition values including a torque value of the motor; and
preventing an abnormal noise, the preventing increasing the rotation of the first rotating body or weakening pressing applied by the second rotating body to the first rotating body in a case where it is determined by the determining that the abnormal noise occurs.

* * * * *